United States Patent [19]
Pajonk

[11] Patent Number: 5,513,095
[45] Date of Patent: Apr. 30, 1996

[54] FLEXIBLE AUTOMATION SYSTEM FOR VARIABLE INDUSTRIAL PROCESSES

[75] Inventor: Manfred Pajonk, Bochum, Germany

[73] Assignee: Siemens Aktiengesellschaft, München, Germany

[21] Appl. No.: 80,731

[22] Filed: Jun. 21, 1993

Related U.S. Application Data

[63] Continuation of Ser. No. 874,266, Apr. 24, 1992, abandoned, which is a continuation-in-part of Ser. No. 568,352, Aug. 15, 1990.

Foreign Application Priority Data

Aug. 16, 1989 [EP] European Pat. Off. ............ 89115130

[51] Int. Cl.$^6$ ........................... G05B 15/00; G05B 19/02
[52] U.S. Cl. ................. 364/131; 364/130; 364/191; 340/825.22
[58] Field of Search .................... 364/131, 135, 364/136, 138, 130, 133, 191, 192; 395/375, 425; 340/825.22

[56] References Cited

U.S. PATENT DOCUMENTS

| | | | |
|---|---|---|---|
| 3,975,622 | 8/1976 | Horn et al. | 364/146 |
| 4,213,182 | 7/1980 | Eichelberger et al. | 364/493 |
| 4,244,022 | 1/1981 | Kendall | 364/420 |
| 4,459,655 | 7/1984 | Willemin | 364/132 |
| 4,477,882 | 10/1984 | Schumacher et al. | 364/130 |
| 4,488,258 | 12/1984 | Struger et al. | 364/146 |
| 4,570,217 | 2/1986 | Allen et al. | 364/188 |
| 4,998,194 | 3/1991 | Okamoto et al. | 364/133 |
| 5,006,976 | 4/1991 | Jundt | 364/184 |
| 5,038,318 | 8/1991 | Roseman | 364/900 |
| 5,072,374 | 12/1991 | Sexton et al. | 395/800 |
| 5,122,948 | 6/1992 | Zapolin | 364/131 |

FOREIGN PATENT DOCUMENTS 0413044 2/1991 European Pat. Off. .

OTHER PUBLICATIONS

Regelungstechnische Praxis, vol. 26, No. 3, Mar. 1984, pp. 11–126; G. Kuchler: "*Interkama '83: Digitale Processautomatisierungssysteme*".

Automatisierungstechnische Praxis, vol. 27, No. 4, Apr. 1985, pp. 192–199; W. Ammon: "*Das Integrierte Automatisierungssystem von AEG–Telefunken*".

Pressemeldungen Aus Der Elektrotechnik, vol. 14, No. 7, Sep. 1991, Attila Nowak: *Identifying migrated objects using multicast addresses*, pp. 423–431.

*Primary Examiner*—Paul P. Gordon
*Attorney, Agent, or Firm*—Kenyon & Kenyon

[57] ABSTRACT

A flexible automation system for variable industrial processes (e.g. for processes on an oil or gas conveyer platform) includes programmable controllers that are linked via bus subsystems to process variables that are assigned in digital or analog form. The bus subsystems have communication interfaces for retrieving process variables from the programmable controllers. A retrieval signal is assigned to each process variable in coded form.

2 Claims, 3 Drawing Sheets

| variable | local? | how to access? |
|---|---|---|
| DEPTHHOLE 1 | 0 | from b |
| SPEEDHOLE 1 | 0 | from z |
| . | . | . |
| . | . | . |
| . | . | . |
| TEMPHOLE 1 | 1 | don't care |
| . | . | . |
| . | . | . |
| . | . | . |

FIG 3

FLEXIBLE AUTOMATION SYSTEM FOR VARIABLE INDUSTRIAL PROCESSES

CROSS-REFERENCE TO RELATED APPLICATION

The present application is a continuation of application Ser. No. 07/874,266 filed on Apr. 24, 1992, which is, in turn, a continuation-in-part of U.S. Ser. No. 07/568,352 filed on Aug. 15, 1990. Application Ser. No. 07/874,266 has been abandoned and application Ser. No. 07/568,352 is pending.

BACKGROUND OF THE INVENTION

The invention relates generally to a flexible automation system for variable industrial processes, preferable to a flexible automation system for the processes that occur on an oil or gas conveyor platform. The flexible automation system has programmable controllers which are preferably linked via bus subsystems, to which process variables are assigned in digital and analog form. The bus subsystems have communication interfaces for retrieving the process variables from the programmable controllers.

When automated systems are expanded and upgraded, it is frequently necessary to quickly change the scope and sequence of the system's communication. With each change, however, a considerable and complicated amount of programming results that may contain many errors when bus systems as well as a point-to-point system are used. In the course of the operating time of a larger system, this amount of programming can even exceed the original amount of programming.

SUMMARY OF THE INVENTION

The invention relates to a flexible automation system whose design is such that the amount of programming necessary to change a process as well as new programs can be considerably reduced in contrast to known systems with their programming methods. As a consequence, a flexible and rapid adaptation to new information that is received while the system is in operation can be achieved. The previously known blocking threshold for altering the influence of process variables on the automation system can thus be reduced so that overall a better, easily modifiable operational sequence can be obtained which is adapted to the requirements of the process. These advantages are achieved by assigning a retrieval signal in coded form to each process variable. The result is that the process variables of all the programmable controllers requiring these process variables can be accessed under the same code (or name), independently of the node of the networked automation system on which they were measured or determined. When programming the individual programmable controllers of the automation system, the user no longer has to concern himself with the location from which the programmable controller gets its variables. The programming of the individual programmable controller thus becomes independent of the node of the networked automation system at which the process variables were measured or determined.

The invention may provide next to bus subsystems, additional point-to-point systems that have communication interfaces for retrieving process variables from the programmable controllers. In this manner, there is the possibility of creating a multiple redundant overall system in which the transfer of particularly relevant process parameters and process data through the point-to-point connections is possible in an advantageous, reliable and failsafe manner. Thus, the performance reliability of the industrial process is improved considerably. Nevertheless, the quick and simple adaptation of the automation system to new process requirements does not have to be adversely affected.

It is thereby provided that directly and indirectly retrievable process variables are used in the programs of the individual programmable controllers. The term directly retrievable means that a process variable required by a programmable controller is measured or determined by this programmable controller. Otherwise, the process variable must be retrieved indirectly via other programmable controllers. By utilizing directly and indirectly retrievable process variables, the automation system has available to it the greatest possible degree of flexibility, whereby the known physical and logical definitions of the communication interfaces for the programmable controllers are used in a particularly advantageous manner to retrieve the process variables.

In order to simplify the programming, it is provided that the retrieval signals for the process variables are addressed in a programmably controlled manner. Thus, the original programming may also be implemented in a particularly simple manner with little effort, particularly when identical process variables are provided with the same coding, even when they appear at different points of the networked automation system.

BRIEF DESCRIPTION OF THE DRAWINGS

FIG. 3 shows the list of variables for a programmable controller.

DETAILED DESCRIPTION

Figure 1:
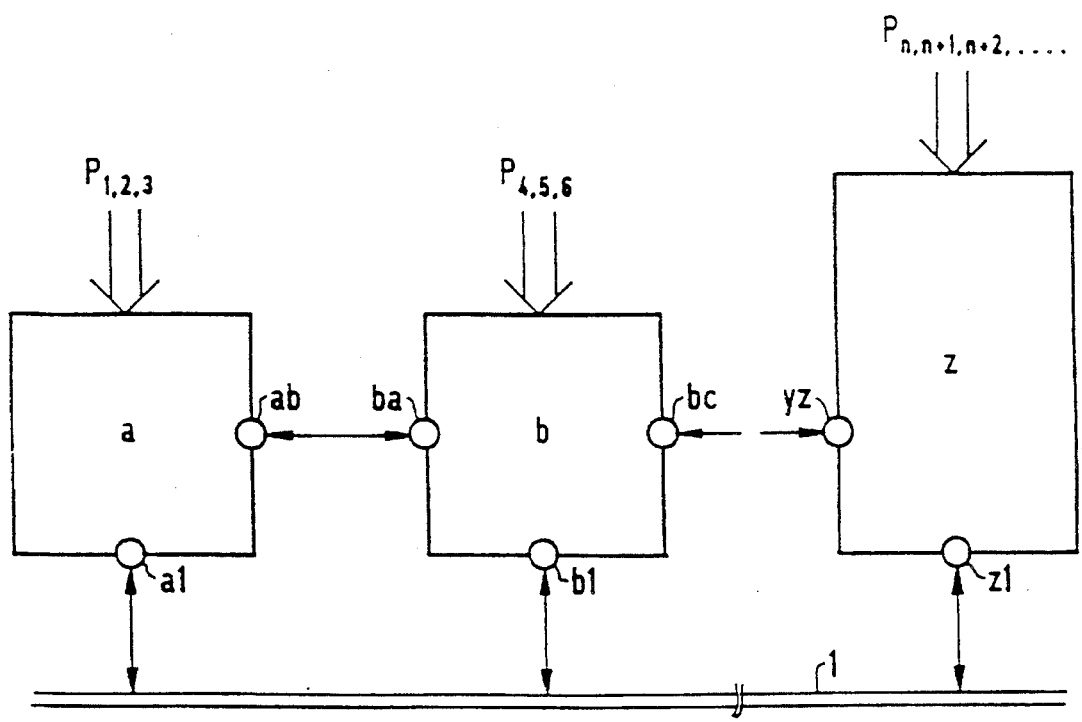
FIG. 1 schematically shows a basic circuit diagram of the invention.

FIG. 1 shows a bus subsystem 1, for example an ethernet bus according to IEEE 802.3, and individual programmable controllers a . . . z. The process variables (i.e., parameters) $P_{1,2,3} \ldots P_{n, n+1, n+x}$, which are each encoded differently according to a predetermined code, are assigned to individual programmable controllers a . . . z. Their encoding virtually corresponds to a naming and is able to be automated with an input device. Typical process variables are, for example, rotational frequency and temperature of the boring head of a boring tower drill.

By way of communication interfaces a1 . . . z1, connections to the bus subsystem 1 are made to the individual programmable controllers a . . . z. Moreover, the automation system also has point-to-point connections between the communication interfaces ab . . . yz, the configuration of which can be arbitrarily selected. The point-to-point connections are selected according to the requirements of each individual case.

The programmable controllers a . . . z are programmed in such a way that, for example, the process variable $P_1$ can be retrieved from all the programmable controllers a . . . z with the code "TEMPHOLE 1". In the present example, the process variable $P_1$ is the temperature in the borehole 1. The process variable $P_1$ may in fact be requested by several of the controllers a . . . z, but only supplied by one of the programmable controllers a . . . z, in this case the controller a.

When the process variable $P_1$ is needed in the programmable controller b, this programmable controller can retrieve this process variable $P_1$ either via the bus 1 or else via the direct connection ab-ba.

In order for the programmable controllers a ... z to know which data they must request from each other and which data they can directly get themselves from the process, a list of all the variables used in the programmable controller is filed in each case by the programmer of the programmable controllers a ... z. FIG. 3 shows an excerpt from the list of the programmable controller a. In these lists, the programmer differentiates at least between directly and indirectly retrievable variables by using an additional coding, for example by setting a flag. In an advantageous refinement of the invention, storage areas for storing the communication paths are also provided in the lists. Indirectly retrievable process variables are supposed to be accessed later through these communication paths.

To establish the communication paths when the programmable controllers a ... z are first operated, a system routine is started which determines which of the process variables $P_{1,2,3} \ldots P_{n,n+1}, _{N+x}$ are supplied and needed by which of the programmable controllers a ... z. Furthermore, this routine knows of all possible communication paths between the programmable controllers a ... z, for example from the contents of a data file or of a storage. The routine then establishes the communication paths for the individual process variables $P_1 \ldots P_{n+x}$ and stores them in the programmable controllers a ... z. The above described routine consequently assigns physical addresses to the (logical) retrieval signals. It is therefore a virtual address processor. The physical and logical definitions of the communication locations, thus the physical and logical addresses, as well as the type of interface are either definitely stipulated by the above-mentioned routine or are manually entered into this routine, whereby it is easily possible, particularly in the latter case, to specify only one part of the possible communication paths. For this reason, it is advantageous that the communication paths are also provided with names.

It is also possible however, for the automation system to determine its possible communication paths itself. This determination can be made, for example, by having each of the programmable controllers a ... z send out a call to all controllers. All programmable controllers a ... z which respond to these calls, can communicate directly with one another. The information about these direct communication paths enables the indirect communication paths to be also automatically determined.

In the present example, it is assumed that the process variable "TEMPHOLE 1" is needed in the programmable controllers a, e, s and z; however, that it is only measured in the programmable controller a. Thus, the application programmer informs the automation system that the programmable controller a is the source programmable controller for the process variable "TEMPHOLE 1". This information about the source of the process variables "TEMPHOLE 1" can be entered, for example, by setting a flag in the list of variables used in the programmable controller a. This flag indicates that the process variable "TEMPHOLE 1" was generated or measured in the programmable controller a itself.

When the automation system starts up, each of the programmable controllers a ... z processes its list of variables. The programmable controller z is described by way of example in the following.

For each process variable which is known locally to the programmable controller z, nothing more is undertaken. For each process variable which is not known locally to the programmable controller z, for example the process variable "TEMPHOLE 1", the above-mentioned system routine is called (i.e., polled) to establish the communication paths. By means of this system routine, it is determined which of the programmable controllers a ... z is the source programmable controller for this process variable, in this example the "TEMPHOLE 1" process variable.

If none or more than one of the programmable controllers a ... z was established by the user as a source programmable controller for this process variable, the result is an error message communicated to the user. Otherwise, the source programmable controller for this process variable (in this example the programmable controller a for the process variable "TEMPHOLE 1") is determined and the corresponding communication path is established. The establishment of the communication path is possible because the system routine knows all the possible or permissible communication paths among the programmable controllers a ... z.

After termination of this routing run, each of the programmable controllers a ... z knows which of its non-locally-generated process variables it can obtain from which of the particular programmable controllers a ... z and on which particular communication path.

If the programmable controller z is supposed to use the process variable "TEMPHOLE 1", for example, then the actual value of the process variable "TEMPHOLE 1" is retrieved from the programmable controller a by means of a standardized request. On the basis of the fetch request, the programmable controller a communicates the actual value of the process variable "TEMPHOLE 1". The communication path from programmable controller z to programmable controller a is thereby stored, for example, in the list of variables of the programmable controller z. The programmable controller a can obtain the information about the communication path used for the feedback of the actual value of the process variable "TEMPHOLE 1", for example, because when the fetch request is made, the communication path is also sent along. Thus, in such a case, the communication path is a fixed component of every fetch request. Alternatively, the communication paths can, of course, also be directly stored in the programmable controllers a ... z.

It is again emphasized at this point, that the information regarding which of the process variables is available in which programmable controller must be initially specified (i.e., input) by the user. The same is true of the possible, or rather permissible, communication paths. The routing, on the other hand, can be automated with this preliminary information. This means that for each programmable controller a ... z, the routing is determined from the location of the non-locally-present process variables.

Analogous to the start-up of the system, system modifications are also easily possible.

As an example, assume that the process variable "TEMPHOLE 1" is no longer intended to be present in the programmable controller a, but rather in the programmable controller e. To carry out these changes, all the user has to do is reset the flag in the list of variables of the programmable controller a, which previously indicated that the process variable "TEMPHOLE 1" was present in the programmable controller a. In the same way, the user has to set the flag assigned to the process variables "TEMPHOLE 1" in the list of variables of the programmable controller e.

If, from this point on, the programmable controller a wants to access the process variable "TEMPHOLE 1", the programmable controller a initially does not know the location of this information. The programmable controller a therefore once again polls the above-mentioned system routine, which, when queried as to which of the programmable controllers a . . . z is the source programmable controller for the process variable "TEMPHOLE 1", determines that it is the programmable controller e. As a result, the system routine determines the corresponding communication path and informs the programmable controller a about this communication path. The programmable controller a can thus immediately access the process variable "TEMPHOLE 1".

An analogous procedure takes place in the case that, for example, the programmable controller z wants to access the process variable "TEMPHOLE 1". Since the programming of the programmable controller z was not changed, the programmable controller z initially attempts to fetch the process variable "TEMPHOLE 1" at the programmable controller a. This attempt leads to an error message. Prompted by this error message, the programmable controller z polls the system routine at this point to establish the communication paths and now obtains, in the same way as the programmable controller a did before, the new, now valid communication path of the process variable "TEMPHOLE 1".

It is thus clear that the effects of local program changes are always only local, so that the programs of the other programmable controllers do not have to be adapted. In this manner, the inhibit threshold for adapting the automation to new conditions is lowered considerably.

Proven (i.e. time-tested) components of automation technology, such as Simatic S5 devices of the Corporation Siemens are used with a visual display system and programming systems, as are all kinds of work stations to program the individual programmable controllers a . . . z, for the coding, etc., such as for the programmable controllers a . . . z themselves. On the whole, a networked system results that is capable of automatically supplying and removing communication interfaces quickly and in an error-free manner, so that the system can advantageously adapt to changes in the program and the process.

Figure 2:
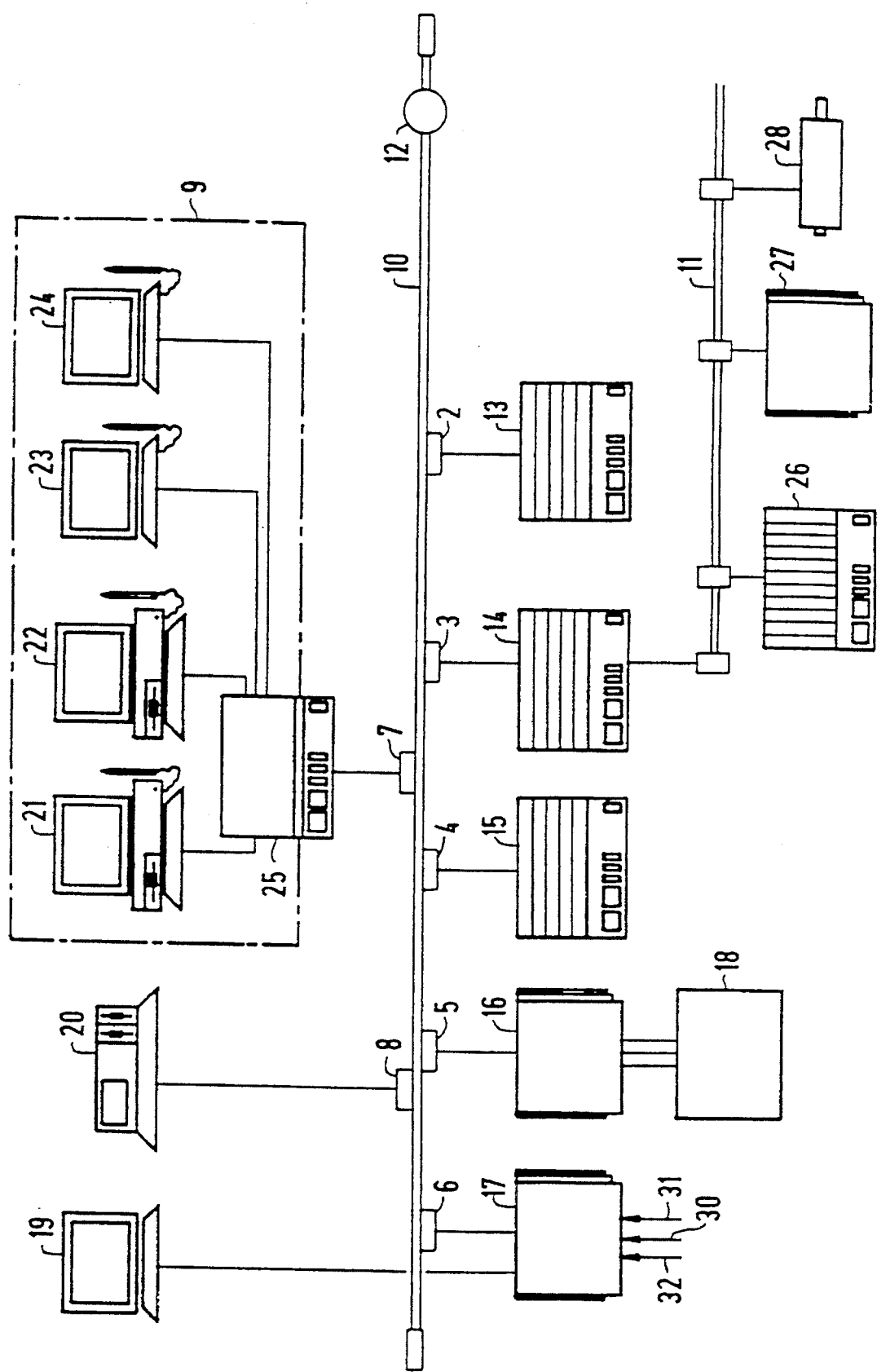
FIG. 2 shows the invention applied to a conveyer platform as an example of one application of the invention.

FIG. 2 shows an automation system for variable industrial processes (for example, for the processes on a conveyer platform for oil or gas which can be modified at any time). FIG. 2 also shows the primary bus system 10. The individual programmable controllers 13, 14, 15, 16 and 17 (for example, any type of Simatic S5 devices) are connected to the primary bus system 10 via serial interfaces 2, 3, 4, 5, 6. Furthermore, the main operator station 20 and the station 25 for connecting the visual display devices 21, 22, 23, and 24 are connected to the primary bus system 10 via interfaces 7, 8. The visual displays devices 21, 22, 23 and 24 are preferably located in a control room 9 in which the main operator station 20 can also be located.

At the same time, the main operator station 20 can be designed as a programming station for the entire system. The central programming may, however, also take place from a separate device. The programmable controllers 13–17 can be supplied both directly with process parameters (for example, from pumps, pressure stations, valves, end switches, etc.) as well as with data from equipment (for example, cranes). This type of equipment is advantageously operated via a local operator station 19 which may be connected to the programmable controller 17. As indicated in FIG. 2, the individual parameters of the equipment are also input as process variables into a programmable controller (in this case into the programmable controller 17) by means of signals 30, 31 and 32.

The process parameters can be assigned to the programmable controllers, such as to programmable controller 16, both directly as well as after being processed via a terminal strip 18 which is provided with microprocessors. In addition, this assignment is also possible via a secondary bus 11 which interconnects the programmable controllers 26, 27, 28 to another controller, such as the programmable controller 14. Overall therefore, an arbitrarily modifiable automation system is possible, whereby an arbitrary assignment of the individual process parameters takes place in an automatically programmed manner by means of the coding.

Both initially as well as during subsequent modifications, considerable savings of both time and cost will result in comparison to the known methods of programming. For the operator of the system, the clear-cut assignment of the individual data packets to the transmission routes is not necessary; however, this is of secondary interest.

The important result achieved by the invention is that neither when executing new programming nor when reprogramming the individual programmable controllers a . . . z does the user have to concern himself with where he gets his process variables from. The networked automation system completes this task automatically. Of course, the present invention is not only applicable to conveyer platforms, but also, for example, to underground mining or to chemical installations.

What is claimed is:

1. A flexible automation system for variable industrial processes comprising:

a plurality of programmable controllers being linked via a connection sub-system, individually-coded digital or analog process variables being selectively assigned to the programmable controllers, the programmable controllers storing respective changeable-by-demand code lists of the process variables, the programmable controllers being coupled to at least one input device for selecting the process variables via the code lists, for accepting the process variables, for passing the process variables between the programmable controllers, and for acknowledging the process variables stored in the code lists, in order to build up a free routing procedure, wherein each programmable controller has programs using directly or indirectly the process variables, first communication interfaces in the connection sub-systems having physical and logical definitions that are specified for said programmable controllers for retrieving said process variables and wherein when one of said programmable controllers calls a process variable that is only indirectly retrievable, said one programmable controller communicates a request to a source programmable controller in which said indirectly retrievable process variable is directly retrievable, said source programmable controller, on the basis of that request, communicating the actual value of the requested process variable to said one programmable controller requesting said indirectly retrievable process variable.

2. A flexible automation system for variable industrial processes comprising:

a plurality of programmable controllers being linked via a connection sub-system, individually-coded digital or analog process variables being selectively assigned to the programmable controllers, the programmable controllers storing respective changeable-by-demand code lists of the process variables, the programmable controllers being coupled to at least one input device for selecting the process variables via the code lists, for accepting the process variables, for passing the process variables between the programmable controllers, and for acknowledging the process variables stored in the code lists, in order to build up a free routing procedure; and a virtual address processor for addressing retrieval signals for the coded process variables, wherein when one of said programmable controllers calls a process variable that is only indirectly retrievable, said one programmable controller communicates a request to a source programmable controller in which said indirectly retrievable process variable is directly retrievable, said source programmable controller, on the basis of that request, communicating the actual value of the requested process variable to said one programmable controller requesting said indirectly retrievable process variable.

* * * * *